United States Patent
Xu et al.

(10) Patent No.: US 9,918,281 B2
(45) Date of Patent: Mar. 13, 2018

(54) PHYSICAL UPLINK SHARED CHANNEL POWER CONTROL METHOD AND APPARATUS THAT CARRY OUT POWER CONTROL IN ACCORDANCE WITH ADJACENT CELL INTERFERENCE

(71) Applicant: China Academy of Telecommunications Technology, Beijing (CN)

(72) Inventors: Mingyu Xu, Beijing (CN); Qiong Li, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 0 days.

(21) Appl. No.: 14/392,219

(22) PCT Filed: Jun. 27, 2014

(86) PCT No.: PCT/CN2014/080952
§ 371 (c)(1),
(2) Date: Dec. 24, 2015

(87) PCT Pub. No.: WO2014/206335
PCT Pub. Date: Dec. 31, 2014

(65) Prior Publication Data
US 2016/0183198 A1     Jun. 23, 2016

(30) Foreign Application Priority Data
Jun. 28, 2013  (CN) .......................... 2013 1 0269628

(51) Int. Cl.
*H04W 52/24*  (2009.01)
*H04W 52/32*  (2009.01)
(Continued)

(52) U.S. Cl.
CPC .......... *H04W 52/243* (2013.01); *H04W 52/08* (2013.01); *H04W 52/146* (2013.01); *H04W 52/241* (2013.01); *H04W 52/325* (2013.01)

(58) Field of Classification Search
CPC ............. H04W 52/146; H04W 52/325; H04W 72/0413; H04W 52/244; H04W 52/243;
(Continued)

(56) References Cited

U.S. PATENT DOCUMENTS

2015/0171984 A1* 6/2015 Jitsukawa ............. H04B 7/024
                                                       370/329
2015/0208428 A1* 7/2015 Park ....................... H04L 1/1887
                                                       370/329

FOREIGN PATENT DOCUMENTS

CN      101394649 A      3/2009
CN      101359938 A      4/2009
(Continued)

OTHER PUBLICATIONS

International Search Report for International Patent Application No. PCT/CN2014/080952 dated Sep. 19, 2014, 2 pages.
(Continued)

*Primary Examiner* — Philip Sobutka
(74) *Attorney, Agent, or Firm* — Morgan Lewis & Bockius LLP (57) ABSTRACT

The present disclosure provides a PUSCH power control method and a PUSCH power control apparatus. According to the present disclosure, the interference of a current cell on its adjacent cells is determined in accordance with interference level information from the adjacent cells, so it is able to adjust PUSCH power for a current cell user, thereby to perform the power control in accordance with the interference among the adjacent cells.

18 Claims, 2 Drawing Sheets

```
┌──────────────────────────────────────────────────────────┐  S101
│   receiving interference level information from adjacent cells │
└──────────────────────────────────────────────────────────┘
                              │
                              ▼
┌──────────────────────────────────────────────────────────┐  S102
│ counting the number of interference levels in the interference │
│   level information from the adjacent cells, and adjusting the │
│   PUSCH power for a current cell user in accordance with a   │
│                      counting result                          │
└──────────────────────────────────────────────────────────┘
```

(51) Int. Cl.
*H04W 52/14* (2009.01)
*H04W 52/08* (2009.01)

(58) Field of Classification Search
CPC ............. H04W 72/082; H04W 52/241; H04W 72/1226
USPC .................................. 455/522, 67.11, 67.13
See application file for complete search history.

(56) References Cited

FOREIGN PATENT DOCUMENTS

| CN | 101541012 A | 9/2009 |
|---|---|---|
| CN | 101729106 A | 9/2010 |
| CN | 101731019 A | 9/2010 |
| CN | 101917729 A | 12/2010 |
| CN | 101986752 A | 3/2011 |
| CN | 102104881 A | 6/2011 |
| CN | 102340858 A | 2/2012 |
| CN | 102348267 A | 2/2012 |
| CN | 102348268 A | 2/2012 |
| CN | 102474831 A | 5/2012 |
| CN | 102413477 A | 11/2012 |
| CN | 103118424 A | 5/2013 |
| EP | 2 306 778 A1 | 4/2011 |
| WO | WO 2011/040792 A2 | 4/2011 |
| WO | WO 2012/139441 A1 | 10/2012 |
| WO | WO 2013/048592 A1 | 4/2013 |

OTHER PUBLICATIONS

Nokia Siemens Networks, Nokia; *Uplink Power Control for LTE-Advanced*, Agenda Document for Discussion and Decision, Oct. 2009, 3GPP TSG RAN WG1 #58bis Meeting, Miyazaki, Japan.
PCT Written Opinion of the International Searching Authority, dated Sep. 19, 2014. International Application No. PCT/CN2014/080952 (with English-language translation).
European Search Report, dated Dec. 20, 2016. Application No. PCT/CN2014/080952.
3GPP TSG RAN WG1, "Transmission Method of Overload Indicator for Inter-cell Transmission Power Control in E-UTRA Uplink," Meeting #49, NTT DoCoMo, NEC, Kobe, Japan, May 7-11, 2007, 2 pages.
3GPP TSG RAN WG2, "QoS Support based on Intercell Interference Coordination," Vodafone, Telecom Italia, Jeju, Korea, Nov. 5-9, 2007, 2 pages.
Chinese First Office Action for CN Application No. 201310269628.7 dated Apr. 1, 2017, 19 pages.
European Communication pursuant to Article 94(3) EPC for EP Application No. 14816567.3 dated Sep. 4, 2017, 5 pages.

* cited by examiner

PHYSICAL UPLINK SHARED CHANNEL POWER CONTROL METHOD AND APPARATUS THAT CARRY OUT POWER CONTROL IN ACCORDANCE WITH ADJACENT CELL INTERFERENCE

CROSS-REFERENCE TO RELATED APPLICATION

The present application is the U.S. national phase of PCT Application No. PCT/CN2014/080952 filed on Jun. 27, 2014, which claims a priority of the Chinese patent application No. 201310269628.7 filed on Jun. 28, 2013, which is incorporated herein by reference in its entirety.

TECHNICAL FIELD

The present disclosure relates to the field of communication technology, in particular to a PUSCH power control method and a PUSCH power control apparatus.

BACKGROUND

For a Long Term Evolution (LTE) system, packet data is transmitted on an Orthogonal Frequency Division Multiplexing (OFDM) basis. When cells are networked at an identical frequency, it is required to carry out power control so as to prevent too strong interference among the cells.

Depending on whether or not transmission power is determined by a transmitter or a receiver, the power control may include open-loop power control and closed-loop power control. For the open-loop power control, the transmitter determines its transmission power based on its understanding of channels. An advantage of the open-loop power control is that no additional signaling overhead is required, and a disadvantage is that there usually exists a difference between the transmitter's understanding of the channels and the actual situation of the channels, so the open-loop power control based on the inaccurate understanding of the channels is usually inaccurate. For the closed-loop power control, the receiver determines the transmission power of the transmitter. An advantage of the closed-loop power control is that the receiver may determine the transmission power of the transmitter in accordance with the actual received signal quality, so it is able to accurately adjust the power. A disadvantage thereof is that additional signaling overhead is required.

As specified in the Standard, transmission power $P_{PUSCH}$ for one OFDM symbol of a Physical Uplink Shared Channel (PUSCH) transmitted by a User Equipment (UE) in subframe i may be calculated by the following equation:

$$P_{PUSCH}(i) = \min\left\{P_{CMAX}, \underbrace{10\log_{10}(M_{PUSCH}(i))}_{\text{Bandwidth Factor}} + \underbrace{P_{O\_PUSCH}(j) + \alpha(j) \cdot PL}_{\text{Substantial Open-Loop Operating Point}} + \underbrace{\Delta_{TF}(i) + f(i)}_{\text{Close-Loop Portion}}\right\}[dBm].$$

$P_{CMAX}$ denotes allowable maximum transmission power of the UE. $M_{PUSCH}(i)$ denotes a bandwidth allocated by an $i^{th}$ subframe for PUSCH and is represented by the number of Physical Resource Blocks (PRBs). $P_{O\_PUSCH}(j)$ is equal to a sum of an 8-bit cell-dedicated normalization portion $P_{O\_NOMINAL\_PUSCH}(j)$ and a 4-bit UE-dedicated portion $P_{O\_UE\_PUSCH}(j)$. $P_{O\_NOMINAL\_PUSCH}(j)$ (j=0 or 1) and $P_{O\_UE\_PUSCH}(j)$ (j=0 or 1) are configured by a Radio Resource Control (RRC) layer. When a resource used by PUSCH initial transmission/retransmission is a Semi-Persistent Scheduling Uplink-grant (SPS UL-grant), j=0, and when the resource used by PUSCH initial transmission/retransmission is a dynamical scheduling UL-grant, j=1. In other words, two different sets of power control parameters are used for the dynamical scheduling PUSCH and the persistent scheduling PUSCH, and are configured by different Information Elements (IEs) of the RRC layer, respectively. For the retransmission or initial transmission of a random access message3 (MSG3), j=2, and at this time, $P_{O\_UE\_PUSCH}(2)=0$ and $P_{O\_NOMINAL\_PUSCH}(2)=P_{O\_PRE}+\Delta_{PREAMBLE\_Msg3}$, $P_{O\_PRE}$ and $\Delta_{PREAMBLE\_Msg3}$ are both configured by the RRC layer. $\alpha(j)$ denotes a power compensation factor. When j=0 or 1, $\alpha\in\{0, 0.4, 0.5, 0.6, 0.7, 0.8, 0.9, 1\}$, i.e., $\alpha(j)$ is a 3-bit cell-level parameter and configured by RRC layer signaling, and when j=2, $\alpha(j)=1$. PL (Path Loss) denotes a downlink path loss detected by the UE in a unit of dB. PL=referenceSignalPower−higher layer filtered RSRP, where ReferenceSignalPower is configured by the RRC layer. $\Delta_{TF}(i)$ denotes a transmission format gain for indicating whether or not to adjust transmission Power Spectrum Density (PSD) in accordance with different Modulation and Coding Scheme (MCS) levels. When $K_S$=1.25, $\Delta_{TF}(i)=10\log_{10}((2^{MPR \cdot K_S}-1)\beta_{offset}^{PUSCH})$, and when $K_S$=0, $\Delta_{TF}(i)=0$, where $K_S$ is a UE-dedicated parameter and indicated by RRC signaling deltaMCS-Enabled. In addition, in the above equation, when the data transmitted via PUSCH merely contains control data other than Uplink-Synchronization Channel (UL-SCH) data, MPR=$O_{CQI}/N_{RE}$, and in the other cases, $$MPR = \sum_{r=0}^{C-1} K_r / N_{RE},$$

where C denotes the number of code blocks, $K_r$ denotes a length of an $r^{th}$ code block, $O_{CQI}$ denotes the number of bits in downlink Channel Quality Indication (CQI) containing Cyclic Redundancy Check (CRC) bits, and $N_{RE}$ denotes the total number of Resource Elements (REs) and it is defined as $N_{RE}=M_{sc}^{PUSCH\text{-}initial} \cdot N_{symb}^{PUSCH\text{-}initial}$, where C, $K_r$, $M_{sc}^{PUSCH\text{-}initial}$ and $N_{symb}^{PUSCH\text{-}initial}$ have been defined in 3GPP Release 36.212, and C, $K_r$ and $M_{sc}^{PUSCH\text{-}initial}$ may be obtained from a Physical Downlink Control Channel (PDCCH) for the initial transmission of transport blocks.

When the data transmitted via PUSCH merely contains the control data other than UL-SCH data, $\beta_{offset}^{PUSCH}=\beta_{offset}^{CQI}$, and in the other cases, $\beta_{offset}^{PUSCH}=1$. f(i) gives a state of the current PUSCH power to be controlled and adjusted, and it is defined as follows.

1. When the power control in a accumulated mode is enabled by the UE-dedicated parameter notified via the RRC layer, i.e., Accumulation-enabled, or when a Transmitter Power Control (TPC) command field $\delta_{PUSCH}$ is contained in Downlink Control Information (DCI) Format0 and the CRC bits use PDCCH scrambled by a Cell Radio Network Temporary Identifier (Temporary C-RNTI), f(i)=f(i−1)+$\delta_{PUSCH}(i-K_{PUSCH})$, where $\delta_{PUSCH}(i-K_{PUSCH})$ denotes a TPC command transmitted by DCI Format0 or Format3/3A on an $(i-K_{PUSCH})^{th}$ subframe, and f(0) denotes an initial value after f(i) is reset.

For Frequency Division Duplex (FDD UL/DL), $K_{PUSCH}=4$. For Time Division Duplex UpLink/DownLink (TDD UL/DL) configurations 1-6, the values of $K_{PUSCH}$ are shown in Table 1. For TDD UL/DL configuration 0, when the PUSCH transmission scheduled by PDCCH DCI Format0 occurs in subframe 2 or 7, and the least significant bit of a UL index information field in DCI is 1, $K_{PUSCH}=7$. For the PUSCH transmission in the other cases, the values of $K_{PUSCH}$ are shown in Table 1.

The UE tries to decode PDCCH of DCI Format0 using its C-RNTI or Semi-Persistent Scheduling-Radio Network Temporary Identifier (SPS-RNTI) at each Discontinuous Reception (DRX) subframe, and also tries to decode PDCCH of DCI Format3/3A using its Transmitter Power Control-Physical Uplink Shared Channel-Radio Network Temporary Identifier (TPC-PUSCH-RNTI).

When both PDCCHs of DCI Format0 and DCI Format3/3A are detected by the UE simultaneously within an identical subframe, the TPC command $\delta_{PUSCH}$ from DCI Format0 is merely used by the UE. When no TPC command is decoded from a certain subframe, or the UE is in a DRX state, or the $i^{th}$ subframe in a TDD mode is not an uplink subframe, $\delta_{PUSCH}=0$ dB. When an accumulated modified value $\delta_{PUSCH}$ dB is contained in PDCCH of DCI Format0, its adjusted values are shown in Table 2. However, when DCI Format0 has a function of SPS activation or SPS releasing, $\delta_{PUSCH}=0$ dB. When the accumulated modified value $\delta_{PUSCH}$ dB is contained in PDCCH of DCI Format3/3A, there are two sets of the adjusted values, i.e., Set 1 shown in Table 2, and Set 2 shown in Table 3. The set of the adjusted values may be determined in accordance with the number of bits of the RRC layer parameter, i.e. TPC-Index.

When the UE has reached the maximum transmission power, the "positive" TPC commands cannot be accumulated, and when the UE has reached the minimum transmission power, the "negative" TPC commands cannot be accumulated. In addition, the accumulation of the TPC commands is required to be reset by the UE when $P_{O\_UE\_PUSCH}$ is changed or when a random access response message is received (the UE is in a synchronous/re-synchronous state).

2. When the accumulated mode is not enabled through the UE-dedicated parameter configured by the RRC layer, i.e., Accumulation-enabled, UE is in an absolute closed-loop mode and $f(i)=\delta_{PUSCH}(i-K_{PUSCH})$, where $\delta_{PUSCH}(i-K_{PUSCH})$ is indicated by PDCCH of DCI Format0 in an $(i-K_{PUSCH})^{th}$ subframe. The values of $K_{PUSCH}$ may be determined as follows. For FDD, $K_{PUSCH}=4$. For TDD UL/DL configurations 1-6, the values of $K_{PUSCH}$ are shown in Table 1. For TDD UL/DL configuration 0, when the PUSCH transmission scheduled by PDCCH of DCI Format0 occurs in subframe 2 or 7 and the least significant bit of the UL index information field in DCI is 1, $K_{PUSCH}=7$, and for the PUSCH transmission in the other cases, the values of $K_{PUSCH}$ are shown in Table 1.

In the absolute mode, $\delta_{PUSCH}$ is indicated by PDCCH of DCI Format0, and its values are shown in Table 2. When DCI Format0 has a function of SPS activation or SPS releasing, $\delta_{PUSCH}=0$ dB. When PDCCH of DCI Format0 is not decoded from a certain subframe, or UE is in the DRX state, or the $i^{th}$ subframe in the TDD mode is not an uplink subframe, $f(i)=f(i-1)$.

3. In methods for calculating the two TPC adjusted values f(*) (in the accumulated mode or the absolute mode), the initial value is set as follows.

When $P_{O\_UE\_PUSCH}$ is changed, f(i)=0, and otherwise, $f(0)=\Delta P_{rampup}+\delta_{msg2}$. $\delta_{msg2}$ denotes the TPC command field indicated in the random access response message, as shown in Table 4, and $\Delta P_{rampup}$ is configured by the RRC layer and corresponds to a total power increment between the initial transmission and the last transmission of Preamble.

TABLE 1

Values of $K_{PUSCH}$ for different TDD UL/DL configurations

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

TABLE 2

Meanings of TPC command fields in DCI Format 0/3

| TPC Command Field in DCI format 0/3 | Accumulated $\delta_{PUSCH}$ [dB] | Absolute $\delta_{PUSCH}$ [dB] only DCI format 0 |
|---|---|---|
| 0 | −1 | −4 |
| 1 | 0 | −1 |
| 2 | 1 | 1 |
| 3 | 3 | 4 |

TABLE 3

Meanings of TPC command fields in DCI Format 3A

| TPC Command Field in DCI format 3A | $\delta_{PUSCH}$ [dB] |
|---|---|
| 0 | −1 |
| 1 | 1 |

TABLE 4

TPC command field $\delta_{msg2}$ of PUSCH for scheduling

| TPC Command | Value (in dB) |
|---|---|
| 0 | −6 |
| 1 | −4 |
| 2 | −2 |
| 3 | 0 |
| 4 | 2 |
| 5 | 4 |
| 6 | 6 |
| 7 | 8 |

Meanwhile, as specified in the Standard, Overload Indicator (OI) information is interacted via an X2 interface. The parameter OI is used to indicate which PRBs of an adjacent cell are strongly interfered. There are three levels for an OI report, and each PRB is represented by two bits, with a minimum update time of 20 ms.

In the equation for calculating the transmission power of uplink PUSCH, the parameters $P_{CMAX}$, $P_{O\_PUSCH}(j)$, $\alpha(j)$, $\Delta_{TF}(i)$ and f(i) are configured by a base station, and the parameter $M_{PUSCH}(i)$ is determined by scheduling. UE merely takes charge of measuring the downlink path loss $PL_{DL}$, and the base station takes charge of determining $P_{O\_PUSCH}(j)$, $\alpha(j)$, $\Delta_{TF}(i)$ and f(i). The algorithm for the uplink PUSCH power control actually includes the setting of an open-look operating point and an algorithm for the closed-loop power control, and a target Signal to Interference plus Noise Ratio (SINR) is required when determining f(i).

The target SINR for the existing uplink PUSCH power control is determined by theoretical calculation. Presumed that $K_S=0$, then $\Delta_{TF}(i)=0$, and at this time, the target SINR may be set as follows.

The target SINR desired at an eNB side may be represented as $SINR_{target}=(P_{O\_PUSCH}(j)+\alpha(j)\cdot PL+f(i)-PL)-(I+N)$. The uplink loss PL is a difference between uplink transmission power and uplink reception power of the UE, i.e., $PL=P_{TX}-P_{RX}$. The uplink reception power $P_{RX}$ of the UE may be measured at the base station, and the uplink transmission power $P_{TX}$ of the UE may be obtained by Power Headroom Report (PHR) using the following equations:

$$PH(i)=P_{CMAX}-\{10\log_{10}(M_{PUSCH}(i))+P_{O\_PUSCH}(j)+\alpha(j)\cdot PL+\Delta_{TF}(i)+f(i)\} \text{ [dB], and}$$

$$P_{TX}=\begin{cases} P_{CMAX}-PH(i) & PH(i)>0 \\ P_{CMAX} & PH(i)\leq 0 \end{cases}.$$

Total uplink interference I+N may be represented as $I+N=(-174 \text{ dBm/Hz}+10*\lg(180 \text{ kHz})+NoiseFigure_{up})+IoT_{up}$. $NoiseFigure_{up}$ denotes a noise index and it usually has a value of 7. $IoT_{up}$ denotes an interference margin for each PRB, and it is used to control the interference of a current cell on an adjacent cell. Currently, this parameter is set as a constant value or set in accordance with IoT measured by the base station in real time.

As can be seen from the above, merely the fixed interference or the real-time interference measured by the base station, rather than the interference between the adjacent cells, is taken into consideration for the current uplink PUSCH power control. The method for the power control in accordance with the fixed interference is simple, but it is impossible to be applied to different scenarios. For the method for the power control in accordance with the real-time interference measured by the base station, the information interaction between the base stations is not required. However, when the interference of an adjacent cell on a current cell is too strong or weak, the power of the current cell is increased or decreased, which thus results in too strong or weak interference on the adjacent cell. At this time, the power of the adjacent cell is increased or decreased, which in turn results in too strong or weak interference on the current cell. Due to such a vicious circle, the system interference is unstable, i.e., it may be increased or decreased gradually, so the system performance may be adversely affected, especially for cell-edge users.

SUMMARY

An object of the present disclosure is to provide a PUSCH power control method and a PUSCH power control apparatus, so as to perform power control in accordance with the interference among adjacent cells.

In one aspect, the present disclosure provides in one embodiment a PUSCH power control method, including steps of: receiving interference level information from adjacent cells; and counting the number of interference levels in the interference level information from the adjacent cells, and adjusting the PUSCH power for a current cell user in accordance with a counting result.

According to the PUSCH power control method in the embodiment of the present disclosure, the interference of a current cell on the adjacent cells is determined in accordance with the interference level information from the adjacent cells, so it is able to adjust the PUSCH power for the current cell user, thereby to perform the power control in accordance with the interference among the adjacent cells.

Alternatively, the interference level information includes a symbol representing a low interference level, an intermediate interference level or a high interference level.

Alternatively, the step of counting the number of interference levels in the interference level information from the adjacent cells, and adjusting the PUSCH power for the current cell user in accordance with the counting result includes: counting, in the interference levels of the adjacent cells, the number of the high interference levels and the number of the low interference levels, and adjusting the PUSCH power of the current cell user in accordance with a counting result; or counting, in the interference levels of the adjacent cells, the number of the high interference levels, the number of the low interference levels and the number of the intermediate interference levels, and adjusting the PUSCH power of the current cell user in accordance with the counting result.

Alternatively, the step of counting, in the interference levels of the adjacent cells, the number of the high interference levels and the number of the low interference levels and adjusting the PUSCH power of the current cell user in accordance with the counting result includes: determining an interference value of the current cell user relative to the adjacent cells in accordance with the interference level information from the adjacent cells using the following equation:

$$\Delta_{IoT_{inter}}=\frac{n\cdot(estimateIoT1-IoT_{target})+p\cdot(estimateIoT2-IoT_{target})}{n+p},$$

where n denotes the number of the low interference levels in the interference levels of the adjacent cells, p denotes the number of the high interference levels in the interference levels of the adjacent cells, estimateIoT1 denotes a predetermined estimated value corresponding to the low interference level, estimateIoT2 denotes a predetermined estimated value corresponding to the high interference level, and $IoT_{target}$ denotes a predetermined target interference value; and adjusting the PUSCH power of the current cell user in accordance with the interference value of the current cell user relative to the adjacent cells.

Of course, the above equation is merely for illustrative purposes, and in the actual application, n may also be the number of the intermediate or high interference levels in the interference levels of the adjacent cells, p may also be the number of the low or intermediate interference levels in the interference levels of the adjacent cells, estimateIoT1 may also be a predetermined estimated value corresponding to the intermediate or high interference level, and estimateIoT2 may also be a predetermined estimated value corresponding to the low or intermediate interference level. n and estimateIoT1 are of an identical meaning, and p and estimateIoT2 are of an identical meaning. Their values may be adjusted flexibly in different application environments, which is not particularly defined herein.

The step of counting, in the interference levels of the adjacent cells, the number of the high interference levels, the number of the low interference levels and the number of the intermediate interference levels and adjusting the PUSCH power of the current cell user in accordance with the counting result includes: determining an interference value of the current cell user relative to the adjacent cells in accordance with the interference level information from the adjacent cells using the following equation:

$$\Delta_{IoT_{inter}} = \frac{n \cdot (estimateIoT1 - IoT_{target}) + p \cdot (estimateIoT2 - IoT_{target})}{m + n + p},$$

where m denotes the number of the intermediate interference levels in the interference levels of the adjacent cells, n denotes the number of the low interference levels in the interference levels of the adjacent cells, p denotes the number of the high interference levels in the interference levels of the adjacent cells, estimateIoT1 denotes a predetermined estimated value corresponding to the low interference level, estimateIoT2 denotes a predetermined estimated value corresponding to the high interference level, and $IoT_{target}$ denotes a predetermined target interference value; and adjusting the PUSCH power of the current cell user in accordance with the interference value of the current cell user relative to the adjacent cells.

Of course, the above equation is merely for illustrative purposes, and in the actual application, m may also be the number of the low or high interference levels in the interference levels of the adjacent cells, n may also be the number of the intermediate or high interference levels in the interference levels of the adjacent cells, p may also be the number of the low or intermediate interference levels in the interference levels of the adjacent cells, estimateIoT1 may also be a predetermined estimated value corresponding to the intermediate or high interference level, and estimateIoT2 may also be a predetermined estimated value corresponding to the low or intermediate interference level. n and estimateIoT1 are of an identical meaning, and p and estimateIoT2 are of an identical meaning. Their values may be adjusted flexibly in different application environments, which is not particularly defined herein.

Alternatively, the step of adjusting the PUSCH power of the current cell user in accordance with the interference value of the current cell user relative to the adjacent cells includes: updating a power compensation factor α(j), a normalized expected reception PSD $P_{O\_NOMINAL\_PUSCH}(j)$ an expected reception PSD offset $P_{O\_UE\_PUSCH}(j)$ of a UE, a gain $\Delta_{TF}(i)$ of a transmission format, or a target SINR in accordance with the interference value of the current cell user relative to the adjacent cells; updating a relevant parameter for calculating the target SINR in accordance with the updated α(j), $P_{O\_NOMINAL\_PUSCH}(j)$, $P_{O\_UE\_PUSCH}(j)$ or $\Delta_{TF}(i)$; and transmitting the relevant parameter for calculating the target SINR via RRC signaling to users whose powers are required to be adjusted, and updating the target SINR in accordance with the updated relevant parameter for calculating the target SINR.

Alternatively, the step of adjusting the PUSCH power of the current cell user in accordance with the interference value of the current cell user on the adjacent cells includes: after determining the SINR, modifying the target SINR in accordance with the interference value of the current cell user relative to the adjacent cells; and transmitting the modified target SINR via a closed-loop TPC command field to the users for which the power adjustment is to be performed.

Alternatively, the user for which the power adjustment is to be performed is determined in accordance with one of an A3 event, spectral efficiency and a difference in path loss between a current cell and an adjacent cell, or a combination thereof. The users for which the power adjustment is to be performed include all users in the current cell, all cell-edge users in the current cell, all cell-center users in the current cell, or specific users in the current cell.

Alternatively, the method further includes: measuring interference levels of the adjacent cells relative to the current cell; when the interference levels of the adjacent cells relative to the current cell are less than or equal to a first predetermined threshold, determining the interference levels as the low interference levels, when the interference levels of the adjacent cells relative to the current cell are greater than a second predetermined threshold, determining the interference levels as the high interference levels, and when the interference levels of the adjacent cells relative to the current cell are greater than the first predetermined threshold and less than or equal to the second predetermined threshold, determining the interference levels as the intermediate interference levels; and transmitting the interference level information to the adjacent cells.

Alternatively, the step of measuring the interference levels of the adjacent cells relative to the current cell includes: measuring interference values of the adjacent cells in each PRB relative to the current cell respectively, and taking the measured interference values of the adjacent cells relative to the current cell as the interference levels of the adjacent cells in each PRB relative to the current cell respectively; or measuring interference values of the adjacent cells in each PRB relative to the current cell respectively, and taking an average value of the measured interference values of the adjacent cells relative to the current cell as the interference level of the adjacent cells in each PRB relative to the current cell.

In another aspect, the present disclosure provides in one embodiment a PUSCH power control apparatus, including: a reception unit configured to receive interference level information from adjacent cells; and an adjustment unit configured to count the number of interference levels in the interference level information from the adjacent cells, and adjust the PUSCH power for a current cell user in accordance with a counting result.

According to the PUSCH power control apparatus in the embodiment of the present disclosure, the interference of a current cell on the adjacent cells is determined in accordance with the interference level information from the adjacent cells, so it is able to adjust the PUSCH power for the current cell user, thereby to perform the power control in accordance with the interference among the adjacent cells.

Alternatively, the interference level information includes a symbol representing a low interference level, an intermediate interference level or a high interference level.

Alternatively, the adjustment unit is specifically configured to: count, in the interference levels of the adjacent cells, the number of the high interference levels and the number of the low interference levels, and adjust the PUSCH power of the current cell user in accordance with a counting result; or count, in the interference levels of the adjacent cells, the number of the high interference levels, the number of the low interference levels and the number of the intermediate interference levels, and adjust the PUSCH power of the current cell user in accordance with the counting result.

Alternatively, the adjustment unit is specifically configured to: determine an interference value of the current cell user relative to the adjacent cells in accordance with the interference level information from the adjacent cells using the following equation:

$$\Delta_{IoT_{inter}} = \frac{n \cdot (estimateIoT1 - IoT_{target}) + p \cdot (estimateIoT2 - IoT_{target})}{n + p},$$

where n denotes the number of the low interference levels in the interference levels of the adjacent cells, p denotes the number of the high interference levels in the interference levels of the adjacent cells, estimateIoT1 denotes a predetermined estimated value corresponding to the low interference level, estimateIoT2 denotes a predetermined estimated value corresponding to the high interference level, and $IoT_{target}$ denotes a predetermined target interference value; and adjust the PUSCH power of the current cell user in accordance with the interference value of the current cell user relative to the adjacent cells.

Of course, the above equation is merely for illustrative purposes, and in the actual application, n may also be the number of the intermediate or high interference levels in the interference levels of the adjacent cells, p may also be the number of the low or intermediate interference levels in the interference levels of the adjacent cells, estimateIoT1 may also be a predetermined estimated value corresponding to the intermediate or high interference level, and estimateIoT2 may also be a predetermined estimated value corresponding to the low or intermediate interference level. n and estimateIoT1 are of an identical meaning, and p and estimateIoT2 are of an identical meaning. Their values may be adjusted flexibly in different application environments, which is not particularly defined herein.

Alternatively, the adjustment unit is specifically configured to: determine an interference value of the current cell user relative to the adjacent cells in accordance with the interference level information from the adjacent cells using the following equation:

$$\Delta_{IoT_{inter}} = \frac{n \cdot (estimateIoT1 - IoT_{target}) + p \cdot (estimateIoT2 - IoT_{target})}{m + n + p},$$

where m denotes the number of the intermediate interference levels in the interference levels of the adjacent cells, n denotes the number of the low interference levels in the interference levels of the adjacent cells, p denotes the number of the high interference levels in the interference levels of the adjacent cells, estimateIoT1 denotes a predetermined estimated value corresponding to the low interference level, estimateIoT2 denotes a predetermined estimated value corresponding to the high interference level, and $IoT_{target}$ denotes a predetermined target interference value; and adjust the PUSCH power of the current cell user in accordance with the interference value of the current cell user relative to the adjacent cells.

Of course, the above equation is merely for illustrative purposes, and in the actual application, m may also be the number of the low or high interference levels in the interference levels of the adjacent cells, n may also be the number of the intermediate or high interference levels in the interference levels of the adjacent cells, p may also be the number of the low or intermediate interference levels in the interference levels of the adjacent cells, estimateIoT1 may also be a predetermined estimated value corresponding to the intermediate or high interference level, and estimateIoT2 may also be a predetermined estimated value corresponding to the low or intermediate interference level. n and estimateIoT1 are of an identical meaning, and p and estimateIoT2 are of an identical meaning. Their values may be adjusted flexibly in different application environments, which is not particularly defined herein.

Alternatively, the adjustment unit is specifically configured to: update a power compensation factor $\alpha(j)$, a normalized expected reception PSD $P_{O\_NOMINAL\_PUSCH}(j)$, an expected reception PSD offset $P_{O\_UE\_PUSCH}(j)$ of a UE, a gain $\Delta_{TF}(i)$ of a transmission format, or a target SINR in accordance with the interference value of the current cell user relative to the adjacent cells; update a relevant parameter for calculating the target SINR in accordance with the updated $\alpha(j)$, $P_{O\_NOMINAL\_PUSCH}(j)$, $P_{O\_UE\_PUSCH}(j)$ or $\Delta_{TF}(i)$; and transmit the relevant parameter for calculating the target SINR via RRC signaling to users whose powers are required to be adjusted, and update the target SINR in accordance with the updated relevant parameter for calculating the target SINR.

Alternatively, the adjustment unit is specifically configured to: after the target SINR has been determined, modify the target SINR in accordance with the interference value of the current cell user relative to the adjacent cells; and transmit the modified target SINR via a closed-loop TPC command field to the users for which the power adjustment is to be performed.

Alternatively, the adjustment unit is configured to determine the user for which the power adjustment is to be performed in accordance with one of an A3 event, spectral efficiency and a difference in path loss between a current cell and an adjacent cell, or a combination thereof. The users for which the power adjustment is to be performed include all users in the current cell, all cell-edge users in the current cell, all cell-center users in the current cell, or specific users in the current cell.

Alternatively, the apparatus further includes: a transmission unit configured to measure interference levels of the adjacent cells relative to the current cell; when the interference levels of the adjacent cells relative to the current cell are less than or equal to a first predetermined threshold, determine the interference levels as the low interference levels, when the interference levels of the adjacent cells relative to the current cell are greater than a second predetermined threshold, determine the interference levels as the high interference levels, and when the interference levels of the adjacent cells relative to the current cell are greater than the first predetermined threshold and less than or equal to the second predetermined threshold, determine the interference levels as the intermediate interference levels; and transmit the interference level information to the adjacent cells.

Alternatively, the transmission unit is specifically configured to: measure interference values of the adjacent cells in each PRB relative to the current cell respectively, and take the measured interference values of the adjacent cells relative to the current cell as the interference levels of the adjacent cells in each PRB relative to the current cell respectively; or measure interference values of the adjacent cells in each PRB relative to the current cell respectively, and take an average value of the measured interference values of the adjacent cells relative to the current cell as the interference level of the adjacent cells in each PRB relative to the current cell.

In yet another aspect, the present disclosure provides in one embodiment a PUSCH power control apparatus, including: a reception port configured to receive interference level information from adjacent cells; and a processor configured to count the number of interference levels in the interference level information from the adjacent cells, and adjust the PUSCH power for a current cell user in accordance with a counting result.

According to the PUSCH power control apparatus in the embodiment of the present disclosure, the interference of a current cell on the adjacent cells is determined in accordance with the interference level information from the adjacent cells, so it is able to adjust the PUSCH power for the current cell user, thereby to perform the power control in accordance with the interference among the adjacent cells.

Alternatively, the interference level information includes a symbol representing a low interference level, an intermediate interference level or a high interference level.

Alternatively, the processor is specifically configured to: count, in the interference levels of the adjacent cells, the number of the high interference levels and the number of the low interference levels, and adjust the PUSCH power of the current cell user in accordance with a counting result; or count, in the interference levels of the adjacent cells, the number of the high interference levels, the number of the low interference levels and the number of the intermediate interference levels, and adjust the PUSCH power of the current cell user in accordance with the counting result.

Alternatively, the processor is specifically configured to: determine an interference value of the current cell user relative to the adjacent cells in accordance with the interference level information from the adjacent cells using the following equation:

$$\Delta_{IoT_{inter}} = \frac{n \cdot (estimateIoT1 - IoT_{target}) + p \cdot (estimateIoT2 - IoT_{target})}{n + p},$$

where n denotes the number of the low interference levels in the interference levels of the adjacent cells, p denotes the number of the high interference levels in the interference levels of the adjacent cells, estimateIoT1 denotes a predetermined estimated value corresponding to the low interference level, estimateIoT2 denotes a predetermined estimated value corresponding to the high interference level, and $IoT_{target}$ denotes a predetermined target interference value; and adjust the PUSCH power of the current cell user in accordance with the interference value of the current cell user relative to the adjacent cells.

Of course, the above equation is merely for illustrative purposes, and in the actual application, n may also be the number of the intermediate or high interference levels in the interference levels of the adjacent cells, p may also be the number of the low or intermediate interference levels in the interference levels of the adjacent cells, estimateIoT1 may also be a predetermined estimated value corresponding to the intermediate or high interference level, and estimateIoT2 may also be a predetermined estimated value corresponding to the low or intermediate interference level. n and estimateIoT1 are of an identical meaning, and p and estimateIoT2 are of an identical meaning. Their values may be adjusted flexibly in different application environments, which is not particularly defined herein.

Alternatively, the processor is specifically configured to: determine an interference value of the current cell user relative to the adjacent cells in accordance with the interference level information from the adjacent cells using the following equation:

$$\Delta_{IoT_{inter}} = \frac{n \cdot (estimateIoT1 - IoT_{target}) + p \cdot (estimateIoT2 - IoT_{target})}{m + n + p},$$

where m denotes the number of the intermediate interference levels in the interference levels of the adjacent cells, n denotes the number of the low interference levels in the interference levels of the adjacent cells, p denotes the number of the high interference levels in the interference levels of the adjacent cells, estimateIoT1 denotes a predetermined estimated value corresponding to the low interference level, estimateIoT2 denotes a predetermined estimated value corresponding to the high interference level, and $IoT_{target}$ denotes a predetermined target interference value; and adjust the PUSCH power of the current cell user in accordance with the interference value of the current cell user relative to the adjacent cells.

Of course, the above equation is merely for illustrative purposes, and in the actual application, m may also be the number of the low or high interference levels in the interference levels of the adjacent cells, n may also be the number of the intermediate or high interference levels in the interference levels of the adjacent cells, p may also be the number of the low or intermediate interference levels in the interference levels of the adjacent cells, estimateIoT1 may also be a predetermined estimated value corresponding to the intermediate or high interference level, and estimateIoT2 may also be a predetermined estimated value corresponding to the low or intermediate interference level. n and estimateIoT1 are of an identical meaning, and p and estimateIoT2 are of an identical meaning. Their values may be adjusted flexibly in different application environments, which is not particularly defined herein.

Alternatively, the processor is specifically configured to: update a power compensation factor α(j), a normalized expected reception PSD $P_{O\_NOMINAL\_PUSCH}(j)$, an expected reception PSD offset $P_{O\_UE\_PUSCH}(j)$ of a UE, a gain $\Delta_{TF}(i)$ of a transmission format, or a target SINR in accordance with the interference value of the current cell user relative to the adjacent cells; update a relevant parameter for calculating the target SINR in accordance with the updated α(j), $P_{O\_NOMINAL\_PUSCH}(j)$, $P_{O\_UE\_PUSCH}(j)$ or $\Delta_{TF}(i)$; and transmit the relevant parameter for calculating the target SINR via RRC signaling to users whose power is to required to be adjusted, and update the target SINR in accordance with the updated relevant parameter for calculating the target SINR.

Alternatively, the processor is specifically configured to: after the target SINR has been determined, modify the target SINR in accordance with the interference value of the current cell user relative to the adjacent cells; and transmit the modified target SINR via a closed-loop TPC command field to the users for which the power adjustment is to be performed.

Alternatively, the processor is configured to determine the user for which the power adjustment is to be performed in accordance with one of an A3 event, spectral efficiency and a difference in path loss between a current cell and an adjacent cell, or a combination thereof. The users for which the power adjustment is to be performed include all users in the current cell, all cell-edge users in the current cell, all cell-center users in the current cell, or specific users in the current cell.

Alternatively, the apparatus further includes a transmission port configured to measure interference levels of the adjacent cells relative to the current cell; when the interference levels of the adjacent cells relative to the current cell are less than or equal to a first predetermined threshold, determine the interference levels as the low interference levels, when the interference levels of the adjacent cells relative to the current cell are greater than a second predetermined threshold, determine the interference levels as the high interference levels, and when the interference levels of the adjacent cells relative to the current cell are greater than the first predetermined threshold and less than or equal to the second predetermined threshold, determine the interference levels as the intermediate interference levels; and transmit the interference level information to the adjacent cells.

Alternatively, the transmission port is specifically configured to: measure interference values of the adjacent cells in each PRB relative to the current cell respectively, and take the measured interference values of the adjacent cells relative to the current cell as the interference levels of the adjacent cells in each PRB relative to the current cell respectively; or measure interference values of the adjacent cells in each PRB relative to the current cell respectively, and take an average value of the measured interference values of the adjacent cells relative to the current cell as the interference level of the adjacent cells in each PRB relative to the current cell.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may, without any creative effort, obtain the other embodiments, which also fall within the scope of the present disclosure.

The present disclosure provides in the embodiments a PUSCH power control method and a PUSCH power control apparatus, so as to determine its interference on adjacent cells in accordance with interference level information from the adjacent cells and adjust PUSCH power of a current cell user, thereby to carry out power control in accordance with the interference between the adjacent cells.

Figure 1:
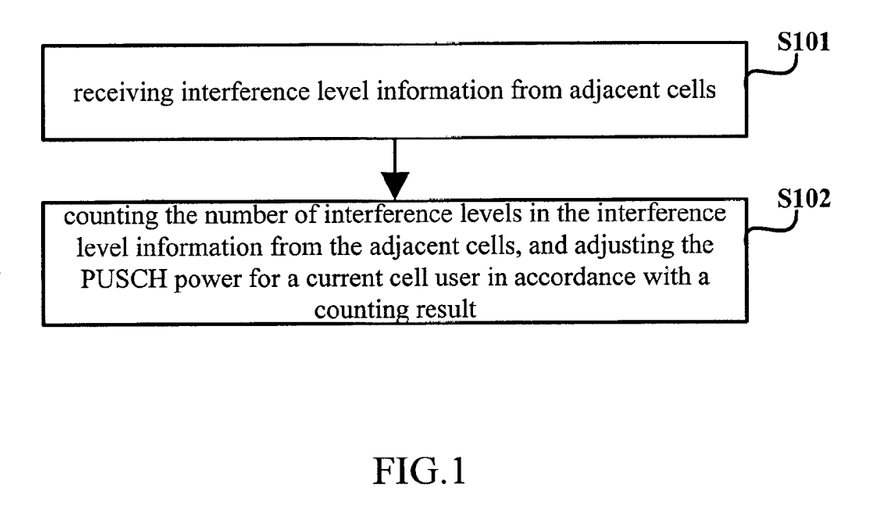
FIG. 1 is a flow chart of a PUSCH power control method according to one embodiment of the present disclosure.

As shown in FIG. 1, the PUSCH power control method in some embodiments of the present disclosure includes: Step S101 of receiving interference level information from adjacent cells; and Step S102 of counting the number of interference levels in the interference level information from the adjacent cells, and adjusting the PUSCH power for a current cell user in accordance with a counting result.

According to the PUSCH power control method in some embodiments of the present disclosure, whether or not to increase or decrease the power is determined in accordance with an OI representing an interference level of the adjacent cell transmitted to a current cell. In other words, when the OI from the adjacent cell is of a small value, it means that the interference of the current cell on the adjacent cell is relatively weak, and at this time the power of the current cell may be appropriately increased so as to improve the user performance. On the other hand, when the OI from the adjacent cell is of a large value, it means that the interference of the current cell on the adjacent cell is relatively strong, and at this time the power of the current cell may be appropriately decreased so as to reduce the interference.

The interference level information includes a symbol representing a low interference level, an intermediate interference level or a high interference level. For example, numerals 0, 1 and 2 may be used to represent the low interference level, the intermediate interference level and the high interference level, respectively.

One cell usually has a plurality of adjacent cells, and the interference levels transmitted from these adjacent cells may be different from each other. Step S102 of counting the number of interference levels in the interference level information from the adjacent cells, and adjusting the PUSCH power for the current cell user in accordance with the counting result includes: counting, in the interference levels of the adjacent cells, the number of the high interference levels and the number of the low interference levels, and adjusting the PUSCH power of the current cell user in accordance with a counting result; or counting, in the interference levels of the adjacent cells, the number of the high interference levels, the number of the low interference levels and the number of the intermediate interference levels, and adjusting the PUSCH power of the current cell user in accordance with the counting result.

To be specific, the step of counting, in the interference levels of the adjacent cells, the number of the high interference levels and the number of the low interference levels and adjusting the PUSCH power of the current cell user in accordance with the counting result includes: determining an interference value of the current cell user relative to the adjacent cells in accordance with the interference level information from the adjacent cells using the following equation:

$$\Delta_{IoT_{inter}} = \frac{n \cdot (estimateIoT1 - IoT_{target}) + p \cdot (estimateIoT2 - IoT_{target})}{n+p},$$

where n denotes the number of the low interference levels in the interference levels of the adjacent cells, p denotes the number of the high interference levels in the interference levels of the adjacent cells, estimateIoT1 denotes a predetermined estimated value corresponding to the low interference level, estimateIoT2 denotes a predetermined estimated value corresponding to the high interference level, and $IoT_{target}$ denotes a predetermined target interference value; and adjusting the PUSCH power of the current cell user in accordance with the interference value of the current cell user relative to the adjacent cells.

Of course, the above equation is merely for illustrative purposes, and in the actual application, n may also be the number of the intermediate or high interference levels in the interference levels of the adjacent cells, p may also be the number of the low or high interference levels in the interference levels of the adjacent cells, estimateIoT1 may also be a predetermined estimated value corresponding to the intermediate or high interference level, and estimateIoT2 may also be a predetermined estimated value corresponding to the low or intermediate interference level. n and estimateIoT1 are of an identical meaning, and p and estimateIoT2 are of an identical meaning. Their values may be adjusted flexibly in different application environments, which is not particularly defined herein.

Similarly, the step of counting, in the interference levels of the adjacent cells, the number of the high interference levels, the number of the low interference levels and the number of the intermediate interference levels and adjusting the PUSCH power of the current cell user in accordance with the counting result includes: determining an interference value of the current cell user relative to the adjacent cells in accordance with the interference level information from the adjacent cells using the following equation:

$$\Delta_{IoT_{inter}} = \frac{n \cdot (estimateIoT1 - IoT_{target}) + p \cdot (estimateIoT2 - IoT_{target})}{m + n + p},$$

where m denotes the number of the intermediate interference levels in the interference levels of the adjacent cells, n denotes the number of the low interference levels in the interference levels of the adjacent cells, p denotes the number of the high interference levels in the interference levels of the adjacent cells, estimateIoT1 denotes a predetermined estimated value corresponding to the low interference level, estimateIoT2 denotes a predetermined estimated value corresponding to the high interference level, and $IoT_{target}$ denotes a predetermined target interference value; and adjusting the PUSCH power of the current cell user in accordance with the interference value of the current cell user relative to the adjacent cells.

Of course, the above equation is merely for illustrative purposes, and in the actual application, m may also be the number of the low or high interference levels in the interference levels of the adjacent cells, n may also be the number of the intermediate or high interference levels in the interference levels of the adjacent cells, p may also be the number of the low or intermediate interference levels in the interference levels of the adjacent cells, estimateIoT1 may also be a predetermined estimated value corresponding to the intermediate or high interference level, and estimateIoT2 may also be a predetermined estimated value corresponding to the low or intermediate interference level. n and estimateIoT1 are of an identical meaning, and p and estimateIoT2 are of an identical meaning. Their values may be adjusted flexibly in different application environments, which is not particularly defined herein.

In the above two equations, estimateIoT1, estimateIoT2 and $IoT_{target}$ are each of a predetermined value. For example, when $IoT_{target}$ is set as 10 dB, estimateIoT1 may be set as 5 dB and estimateIoT2 may be set as 15 dB.

The step of adjusting the PUSCH power of the current cell user in accordance with the interference value of the current cell user relative to the adjacent cells includes: updating a power compensation factor $\alpha(j)$, a normalized expected reception PSD $P_{O\_NOMINAL\_PUSCH}(j)$ an expected reception PSD offset $P_{O\_UE\_PUSCH}(j)$ of a UE, a gain $\Delta_{TF}(i)$ of a transmission format, or a target SINR in accordance with the interference value of the current cell user relative to the adjacent cells; updating a relevant parameter for calculating the target SINR in accordance with the updated $\alpha(j)$, $P_{O\_NOMINAL\_PUSCH}(j)$, $P_{O\_UE\_PUSCH}(j)$ or $\Delta_{TF}(i)$; and transmitting the relevant parameter for calculating the target SINR via RRC signaling to users whose powers are required to be adjusted, and updating the target SINR in accordance with the updated relevant parameter for calculating the target SINR.

To be specific, $\alpha(j)$ is modified in accordance with the interference value of the current cell user relative to the adjacent cell, i.e., $P_{O\_UE\_PUSCH}(j)=f(\Delta_{IoT_{inter}})$. For example, when $\Delta_{IoT_{inter}}>0$, $\alpha(j)=\alpha(j)-0.1$; otherwise, $\alpha(j)$ remains unchanged. $P_{O\_NOMINAL\_PUSCH}(j)$ is modified in accordance with the interference value of the current cell user relative to the adjacent cell, i.e., $P_{O\_NOMINAL\_PUSCH}(j)=f(\Delta_{IoT_{inter}})$. For example, $P_{O\_NOMINAL\_PUSCH}(j)=P_{O\_NOMINAL\_PUSCH}(j)-\Delta_{IoT_{inter}}$. $P_{O\_UE\_PUSCH}(j)$ is modified in accordance with the interference value of the current cell user relative to the adjacent cell, i.e., $P_{O\_UE\_PUSCH}(j)=f(\Delta_{IoT_{inter}})$. For example, $P_{O\_UE\_PUSCH}(j)=P_{O\_UE\_PUSCH}(j)-\Delta_{IoT_{inter}}$. $\Delta_{TF}(i)$ is modified in accordance with the interference value of the current cell user relative to the adjacent cell, i.e., $\Delta_{TF}(i)=f(\Delta_{IoT_{inter}})$. For example, when $\Delta_{IoT_{inter}}>0$, $\Delta_{TF}(i)=10\log_{10}((2^{MPR \cdot K_S}-1)\beta_{offset}^{PUSCH})$; otherwise, $\Delta_{TF}(i)$ remains unchanged.

Alternatively, the target SINR may be adjusted after it has been determined. At this time, the step of adjusting the PUSCH power of the current cell user in accordance with the interference value of the current cell user on the adjacent cells includes: after determining the SINR, modifying the target SINR in accordance with the interference value of the current cell user relative to the adjacent cells; and transmitting the modified target SINR via a closed-loop TPC command field to the users for which the power adjustment is to be performed.

To be specific, the modified target SINR may be determined as $SINR_{target\_modified}=SINR_{target}-\Delta IoT_{inter}$, where $SINR_{target}$ denotes the target SINR before modification, and $\Delta IoT_{inter}$ denotes the interference value of the current cell user relative to the adjacent cell.

When the user is notified via RRC signaling to carry out the power adjustment, many pieces of RRC signaling may be used and an air interface resource may be occupied. However, in this mode, a single adjustment range is relatively large. When the user is notified via the closed-loop TPC command field to carry out the power adjustment, a single adjustment range is relatively small, and a significant effect may be achieved after the adjustment for many times.

In addition, the interference between the adjacent cells is obtained through load interaction information, so its accuracy is limited. In addition, an X2 interface has a minimum period of 20 ms, and for saving the X2 interface information, the inter-cell power control is required to be performed more slowly than the intra-cell power control.

An object for which the power adjustment is performed may be all of or, or parts of, the users in the cell. Alternatively, the user for which the power adjustment is to be performed is determined in accordance with one of an A3 event, spectral efficiency and a difference in path loss between a current cell and an adjacent cell, or a combination thereof. The users for which the power adjustment is to be performed include all users in the current cell, all cell-edge users in the current cell, all cell-center users in the current cell, or specific users in the current cell.

In order to facilitate the power adjustment for the adjacent cells, the method further includes: measuring interference levels of the adjacent cells relative to the current cell; when the interference levels of the adjacent cells relative to the current cell are less than or equal to a first predetermined threshold, determining the interference levels as the low interference levels, when the interference levels of the adjacent cells relative to the current cell are greater than a second predetermined threshold, determining the interference levels as the high interference levels, and when the interference levels of the adjacent cells relative to the current cell are greater than the first predetermined threshold and less than or equal to the second predetermined threshold, determining the interference levels as the intermediate interference levels; and transmitting the interference level information to the adjacent cells.

To be specific, the information desired for the power control is a system Interference over Thermal (IoT) of the adjacent cell (i.e., the interference levels of the adjacent cells relative to the current cell), so there are the following two schemes for determining the interference levels.

Scheme 1: a base stations measures the interference values of the adjacent cells in PRBs relative to the current cell, respectively, and takes an average value of these interference values as the interference levels of the adjacent cells in the PRBs relative to the current cell. In other words, the base station takes the average value of these interference values as the system IoT, and compares it with a predetermined threshold so as to determine the interference levels. The OI values obtained on all of the PRBs are the same. At this time, after receiving the determined interference level, the base station of the adjacent cell may directly select a predetermined estimated value as the IoT in accordance with the OI value.

Scheme 2: a base station measures the interference values of the adjacent cells in the PRBs relative to the current cell, and takes the measured interference values as the interference levels of the adjacent cells in the PRBs relative to the current cell. In other words, the base station measures the IoT on each PRB, and compares it with a predetermined threshold so as to determine the interference level of the adjacent cell relative to the current cell. At this time, after receiving the determined interference level, the base station of the adjacent cell is required to calculate an average value of the interference levels in accordance with the received interference levels on the PRBs, and select a predetermined estimated value as the IoT in accordance with the average value.

For example, the predetermined thresholds are threshold1 and threshold2, and threshold1<threshold2. The thresholds may be configured by an Operation and Maintenance (Q&M) server. When the measured IoT is less than or equal to threshold1, it corresponds to a low interference level. When the measured IoT is greater than threshold1 and less than or equal to threshold2, it corresponds to an intermediate interference level. When the measured IoT is greater than threshold2, it corresponds to a high interference level.

After determining the interference level, the interference level may be transmitted to the adjacent cell via X2 interface through LOAD INFORMATION.

The interference level may be transmitted in a period-triggering or period-plus-event-triggering mode.

In the period-triggering mode, the interference from the adjacent cells is counted periodically, and then the interference information is transmitted to the adjacent cells. In the period-plus-event-triggering mode, the interference from the adjacent cells is counted periodically, and when the interference is greater than a predetermined threshold or less than a predetermined threshold, the interference information OI is transmitted to the adjacent cells.

Figure 2:
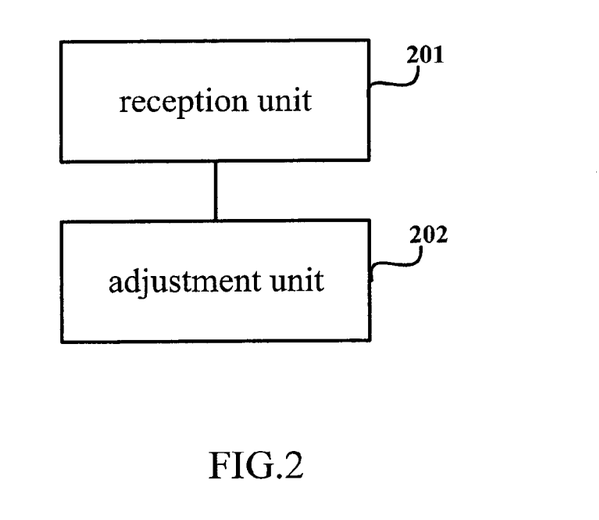
FIG. 2 is a schematic view showing a PUSCH power control apparatus according to one embodiment of the present disclosure.

The present disclosure further provides in some embodiment a PUSCH power control apparatus which, as shown in FIG. 2, includes: a reception unit 201 configured to receive interference level information from adjacent cells; and an adjustment unit 202 configured to count the number of interference levels in the interference level information from the adjacent cells, and adjust the PUSCH power for a current cell user in accordance with a counting result.

The apparatus may be a base station or a relay node. The base station includes a macro eNB, a micro eNB, a pico eNB, or a home eNB (also called as femto eNB), and any other possible wireless Access Points (APs) in a TDD mode.

The interference level information includes a symbol representing a low interference level, an intermediate interference level or a high interference level.

The adjustment unit 202 is specifically configured to: count, in the interference levels of the adjacent cells, the number of the high interference levels and the number of the low interference levels, and adjust the PUSCH power of the current cell user in accordance with a counting result; or count, in the interference levels of the adjacent cells, the number of the high interference levels, the number of the low interference levels and the number of the intermediate interference levels, and adjust the PUSCH power of the current cell user in accordance with the counting result.

Alternatively, the adjustment unit 202 is specifically configured to: determine an interference value of the current cell user relative to the adjacent cells in accordance with the interference level information from the adjacent cells using the following equation:

$$\Delta_{IoT_{inter}} = \frac{n \cdot (estimateIoT1 - IoT_{target}) + p \cdot (estimateIoT2 - IoT_{target})}{n + p},$$

where n denotes the number of the low interference levels in the interference levels of the adjacent cells, p denotes the number of the high interference levels in the interference levels of the adjacent cells, estimateIoT1 denotes a predetermined estimated value corresponding to the low interference level, estimateIoT2 denotes a predetermined estimated value corresponding to the high interference level, and $IoT_{target}$ denotes a predetermined target interference value; and adjust the PUSCH power of the current cell user in accordance with the interference value of the current cell user relative to the adjacent cells.

Of course, the above equation is merely for illustrative purposes, and in the actual application, n may also be the number of the intermediate or high interference levels in the interference levels of the adjacent cells, p may also be the number of the low or intermediate interference levels in the interference levels of the adjacent cells, estimateIoT1 may also be a predetermined estimated value corresponding to the intermediate or high interference level, and estimateIoT2 may also be a predetermined estimated value corresponding to the low or intermediate interference level. n and estimateIoT1 are of an identical meaning, and p and estimateIoT2 are of an identical meaning. Their values may be adjusted flexibly in different application environments, which is not particularly defined herein.

Alternatively, the adjustment unit 202 is specifically configured to: determine an interference value of the current cell user relative to the adjacent cells in accordance with the interference level information from the adjacent cells using the following equation:

$$\Delta_{IoT_{inter}} = \frac{n \cdot (estimateIoT1 - IoT_{target}) + p \cdot (estimateIoT2 - IoT_{target})}{m + n + p},$$

where m denotes the number of the intermediate interference levels in the interference levels of the adjacent cells, n denotes the number of the low interference levels in the interference levels of the adjacent cells, p denotes the number of the high interference levels in the interference levels of the adjacent cells, estimateIoT1 denotes a predetermined estimated value corresponding to the low interference level, estimateIoT2 denotes a predetermined estimated value corresponding to the high interference level, and $IoT_{target}$ denotes a predetermined target interference value; and adjust the PUSCH power of the current cell user in accordance with the interference value of the current cell user relative to the adjacent cells.

Of course, the above equation is merely for illustrative purposes, and in the actual application, m may also be the number of the low or high interference levels in the interference levels of the adjacent cells, n may also be the number of the intermediate or high interference levels in the interference levels of the adjacent cells, p may also be the number of the low or intermediate interference levels in the interference levels of the adjacent cells, estimateIoT1 may also be a predetermined estimated value corresponding to the intermediate or high interference level, and estimateIoT2 may also be a predetermined estimated value corresponding to the low or intermediate interference level. n and estimateIoT1 are of an identical meaning, and p and estimateIoT2 are of an identical meaning. Their values may be adjusted flexibly in different application environments, which is not particularly defined herein.

Alternatively, the adjustment unit 202 is specifically configured to: update $\alpha(j)$, $P_{O\_NOMINAL\_PUSCH}(j)$, $P_{O\_UE\_PUSCH}(j)$, $\Delta_{TF}(i)$ or a target SINR in accordance with the interference value of the current cell user relative to the adjacent cells; update a relevant parameter for calculating the target SINR in accordance with the updated $\alpha(j)$, $P_{O\_NOMINAL\_PUSCH}(j)$, $P_{O\_UE\_PUSCH}(j)$ or $\Delta_{TF}(i)$; and transmit the relevant parameter for calculating the target SINR via RRC signaling to users whose powers are required to be adjusted, and update the target SINR in accordance with the updated relevant parameter for calculating the target SINR.

Alternatively, the adjustment unit 202 is specifically configured to: after the target SINR has been determined, modify the target SINR in accordance with the interference value of the current cell user relative to the adjacent cells; and transmit the modified target SINR via a closed-loop TPC command field to the users for which the power adjustment is to be performed.

The adjustment unit 202 is configured to determine the user for which the power adjustment is to be performed in accordance with one of an A3 event, spectral efficiency and a difference in path loss between a current cell and an adjacent cell, or a combination thereof. The users for which the power adjustment is to be performed include all users in the current cell, all cell-edge users in the current cell, all cell-center users in the current cell, or specific users in the current cell.

Further, the apparatus includes: a transmission unit configured to measure interference levels of the adjacent cells relative to the current cell; when the interference levels of the adjacent cells relative to the current cell are less than or equal to a first predetermined threshold, determine the interference levels as the low interference levels, when the interference levels of the adjacent cells relative to the current cell are greater than a second predetermined threshold, determine the interference levels as the high interference levels, and when the interference levels of the adjacent cells relative to the current cell are greater than the first predetermined threshold and less than or equal to the second predetermined threshold, determine the interference levels as the intermediate interference levels; and transmit the interference level information to the adjacent cells.

Alternatively, the transmission unit is specifically configured to: measure interference values of the adjacent cells in each PRB relative to the current cell respectively, and take the measured interference values of the adjacent cells relative to the current cell as the interference levels of the adjacent cells in each PRB relative to the current cell respectively; or measure interference values of the adjacent cells in each PRB relative to the current cell respectively, and take an average value of the measured interference values of the adjacent cells relative to the current cell as the interference level of the adjacent cells in each PRB relative to the current cell.

Figure 3:
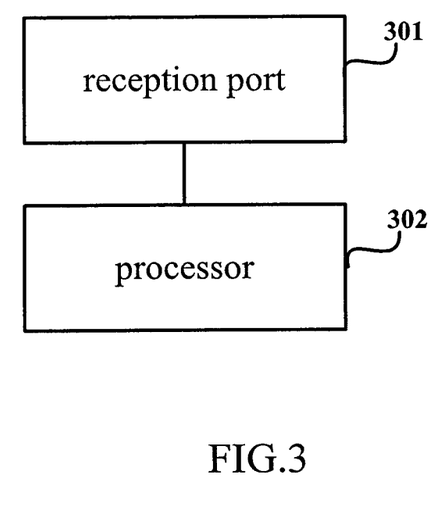
FIG. 3 is another schematic view showing the PUSCH power control apparatus according to one embodiment of the present disclosure.

The present disclosure further provides in some embodiments a PUSCH power control apparatus which, as shown in FIG. 3, includes: a reception port 301 configured to receive interference level information from adjacent cells; and a processor 302 configured to count the number of interference levels in the interference level information from the adjacent cells, and adjust the PUSCH power for a current cell user in accordance with a counting result.

Alternatively, the interference level information includes a symbol representing a low interference level, an intermediate interference level or a high interference level.

Alternatively, the processor 302 is specifically configured to: count, in the interference levels of the adjacent cells, the number of the high interference levels and the number of the low interference levels, and adjust the PUSCH power of the current cell user in accordance with a counting result; or count, in the interference levels of the adjacent cells, the number of the high interference levels, the number of the low interference levels and the number of the intermediate interference levels, and adjust the PUSCH power of the current cell user in accordance with the counting result.

Alternatively, the processor 302 is specifically configured to: determine an interference value of the current cell user relative to the adjacent cells in accordance with the interference level information from the adjacent cells using the following equation:

$$\Delta_{IoT_{inter}} = \frac{n \cdot (estimateIoT1 - IoT_{target}) + p \cdot (estimateIoT2 - IoT_{target})}{n + p},$$

where n denotes the number of the low interference levels in the interference levels of the adjacent cells, p denotes the number of the high interference levels in the interference levels of the adjacent cells, estimateIoT1 denotes a predetermined estimated value corresponding to the low interference level, estimateIoT2 denotes a predetermined estimated value corresponding to the high interference level, and $IoT_{target}$ denotes a predetermined target interference value; and adjust the PUSCH power of the current cell user in accordance with the interference value of the current cell user relative to the adjacent cells.

Of course, the above equation is merely for illustrative purposes, and in the actual application, n may also be the number of the intermediate or high interference levels in the interference levels of the adjacent cells, p may also be the number of the low or intermediate interference levels in the interference levels of the adjacent cells, estimateIoT1 may also be a predetermined estimated value estimateIoT2 may corresponding to the intermediate or high interference level, and estimateIoT2 may also be a predetermined estimated value corresponding to the low or intermediate interference level. n and estimateIoT1 are of an identical meaning, and p and estimateIoT2 are of an identical meaning. Their values may be adjusted flexibly in different application environments, which is not particularly defined herein.

Alternatively, the processor 302 is specifically configured to: determine an interference value of the current cell user relative to the adjacent cells in accordance with the interference level information from the adjacent cells using the following equation $$\Delta_{IoT_{inter}} = \frac{n \cdot (estimateIoT1 - IoT_{target}) + p \cdot (estimateIoT2 - IoT_{target})}{m + n + p},$$

where m denotes the number of the intermediate interference levels in the interference levels of the adjacent cells, n denotes the number of the low interference levels in the interference levels of the adjacent cells, p denotes the number of the high interference levels in the interference levels of the adjacent cells, estimateIoT1 denotes a predetermined estimated value corresponding to the low interference level, estimateIoT2 denotes a predetermined estimated value corresponding to the high interference level, and $IoT_{target}$ denotes a predetermined target interference value; and adjust the PUSCH power of the current cell user in accordance with the interference value of the current cell user relative to the adjacent cells.

Of course, the above equation is merely for illustrative purposes, and in the actual application, m may also be the number of the low or high interference levels in the interference levels of the adjacent cells, n may also be the number of the intermediate or high interference levels in the interference levels of the adjacent cells, p may also be the number of the low or intermediate interference levels in the interference levels of the adjacent cells, estimateIoT1 may also be a predetermined estimated value corresponding to the intermediate or high interference level, and estimateIoT2 may also be a predetermined estimated value corresponding to the low or intermediate interference level. n and estimateIoT1 are of an identical meaning, and p and estimateIoT2 are of an identical meaning. Their values may be adjusted flexibly in different application environments, which is not particularly defined herein.

Alternatively, the processor 302 is specifically configured to: update a power compensation factor $\alpha(j)$, a normalized expected reception PSD $P_{O\_NOMINAL\_PUSCH}(j)$ an expected reception PSD offset $P_{O\_UE\_PUSCH}(j)$ of a UE, a gain $\Delta_{TF}(i)$ of a transmission format, or a target SINR in accordance with the interference value of the current cell user relative to the adjacent cells; update a relevant parameter for calculating the target SINR in accordance with the updated $\alpha(j)$, $P_{O\_NOMINAL\_PUSCH}(j)$, $P_{O\_UE\_PUSCH}(j)$ or $\Delta_{TF}(i)$; and transmit the relevant parameter for calculating the target SINR via RRC signaling to users whose power is to required to be adjusted, and update the target SINR in accordance with the updated relevant parameter for calculating the target SINR.

Alternatively, the processor 302 is specifically configured to: after the SINR has been determined, modify the target SINR in accordance with the interference value of the current cell user relative to the adjacent cells; and transmit the modified target SINR via a closed-loop TPC command field to the users for which the power adjustment is to be performed.

Alternatively, the processor 302 is configured to determine the user for which the power adjustment is to be performed in accordance with one of an A3 event, spectral efficiency and a difference in path loss between a current cell and an adjacent cell, or a combination thereof. The users for which the power adjustment is to be performed include all users in the current cell, all cell-edge users in the current cell, all cell-center users in the current cell, or specific users in the current cell.

Alternatively, the apparatus further includes a transmission port configured to measure interference levels of the adjacent cells relative to the current cell; when the interference levels of the adjacent cells relative to the current cell are less than or equal to a first predetermined threshold, determine the interference levels as the low interference levels, when the interference levels of the adjacent cells relative to the current cell are greater than a second predetermined threshold, determine the interference levels as the high interference levels, and when the interference levels of the adjacent cells relative to the current cell are greater than the first predetermined threshold and less than or equal to the second predetermined threshold, determine the interference levels as the intermediate interference levels; and transmit the interference level information to the adjacent cells.

Alternatively, the transmission port is specifically configured to: measure interference values of the adjacent cells in each PRB relative to the current cell respectively, and take the measured interference values of the adjacent cells relative to the current cell as the interference levels of the adjacent cells in each PRB relative to the current cell respectively; or measure interference values of the adjacent cells in each PRB relative to the current cell respectively, and take an average value of the measured interference values of the adjacent cells relative to the current cell as the interference level of the adjacent cells in each PRB relative to the current cell.

According to the PUSCH power control method and the PUSCH power control apparatus in some embodiments of the present disclosure, it is able to determine the interference of the current cell user on the adjacent cells in accordance with the interference level information from the adjacent cells and adjust the PUSCH power of the current cell user, thereby to carry out the power control in accordance with the interference between the adjacent cells.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, CD-ROM and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

Obviously, a person skilled in the art may make further improvements and modifications without departing from the spirit of the present disclosure. If these improvements and modifications fall within the scope of the appended claims and the equivalents thereof, the present disclosure also intends to include them.

What is claimed is:

1. A Physical Uplink Shared Channel (PUSCH) power control method, comprising:
  receiving interference level information from a plurality of adjacent cells, the interference level information including a plurality of symbols, each respective symbol in the plurality of symbols representing a low interference level, an intermediate interference level or a high interference level of a corresponding adjacent cell in the plurality of adjacent cells;
  counting the plurality of symbols to determine the number of symbols representing the low interference level and the number of symbols representing the high interference level, or to determine the number of symbols representing the low interference level, the number of symbols representing the intermediate interference level, and the number of symbols representing the high interference level; and
  adjusting the PUSCH power for a current cell user in accordance with the number of symbols representing the low interference level and the number of symbols representing the high interference level, or in accordance with the number of symbols representing the low interference level, the number of symbols representing the intermediate interference level and the number of symbols representing the high interference level.

2. The method according to claim 1, wherein the step of counting comprises:
  determining an interference value of the current cell user relative to the adjacent cells in accordance with the interference level information from the adjacent cells using the following equation:

$$\Delta_{IoT_{inter}} = \frac{n \cdot (estimateIoT1 - IoT_{target}) + p \cdot (estimateIoT2 - IoT_{target})}{n + p},$$

where n denotes the number of the low interference levels or the intermediate interference levels or the high interference levels in the interference levels of the adjacent cells, p denotes the number of the high interference levels or the low interference levels or the intermediate interference levels in the interference levels of the adjacent cells, estimateIoT1 denotes a predetermined estimated value corresponding to the low interference level or the intermediate interference levels or the high interference levels, estimateIoT2 denotes a predetermined estimated value corresponding to the high interference level or the low interference level or the intermediate interference levels, n and p are not of an identical meaning, n and estimateIoT1 are of an identical meaning, p and estimateIoT2 are of an identical meaning, and $IoT_{target}$ denotes a predetermined target interference value;
  wherein adjusting the PUSCH power of the current cell user is in accordance with the interference value of the current cell user relative to the adjacent cells,
  or
  the step of counting comprises:
  determining an interference value of the current cell user relative to the adjacent cells in accordance with the interference level information from the adjacent cells using the following equation:

$$\Delta_{IoT_{inter}} = \frac{n \cdot (estimateIoT1 - IoT_{target}) + p \cdot (estimateIoT2 - IoT_{target})}{m + n + p},$$

where m denotes the number of the intermediate interference levels or the low interference levels or the high interference levels in the interference levels of the adjacent cells, n denotes the number of the low interference levels or the high interference levels or the intermediate interference levels in the interference levels of the adjacent cells, p denotes the number of the high interference levels or the intermediate interference levels or the low interference levels in the interference levels of the adjacent cells, estimateIoT1 denotes a predetermined estimated value corresponding to the low interference level or the high interference levels or the intermediate interference levels, estimateIoT2 denotes a predetermined estimated value corresponding to the high interference level or the intermediate interference levels or the low interference levels, m and n and p are not of an identical meaning, n and estimateIoT1 are of an identical meaning, p and estimateIoT2 are of an identical meaning, and $IoT_{target}$ denotes a predetermined target interference value;
  wherein adjusting the PUSCH power of the current cell user is in accordance with the interference value of the current cell user relative to the adjacent cells.

3. The method according to claim 2, wherein the step of adjusting the PUSCH power of the current cell user in accordance with the interference value of the current cell user relative to the adjacent cells comprises:
  updating a power compensation factor α(j), a normalized expected reception Power Spectrum Density (PSD) $P_{O\_NOMINAL\_PUSCH}(j)$ an expected reception PSD offset $P_{O\_UE\_PUSCH}(j)$ of a UE, a gain $\Delta_{TF}(i)$ of a transmission format, or a target Signal to Interference plus Noise Ratio (SINR) in accordance with the interference value of the current cell user relative to the adjacent cells;

updating a relevant parameter for calculating the target SINR in accordance with the updated $\alpha(j)$, $P_{O\_NOMINAL\_PUSCH}(j)$, $P_{O\_UE\_PUSCH}(j)$ or $\Delta_{TF}(i)$; and transmitting the relevant parameter for calculating the target SINR via Radio Resource Control (RRC) signaling to users whose powers are required to be adjusted, and updating the target SINR in accordance with the updated relevant parameter for calculating the target SINR.

4. The method according to claim 3, wherein the user for which the power adjustment is to be performed is determined in accordance with one of an A3 event, spectral efficiency and a difference in path loss between a current cell and an adjacent cell, or a combination thereof, and the users for which the power adjustment is to be performed comprise all users in the current cell, all cell-edge users in the current cell, all cell-center users in the current cell, or specific users in the current cell.

5. The method according to claim 2, wherein the step of adjusting the PUSCH power of the current cell user in accordance with the interference value of the current cell user to the adjacent cells comprises:

after determining the target SINR, modifying the target SINR in accordance with the interference value of the current cell user relative to the adjacent cells; and transmitting the modified target SINR via a closed-loop Transmitter Power Control (TPC) command field to the users for which the power adjustment is to be performed.

6. The method according to claim 5, wherein the user for which the power adjustment is to be performed is determined in accordance with one of an A3 event, spectral efficiency and a difference in path loss between a current cell and an adjacent cell, or a combination thereof, and the users for which the power adjustment is to be performed comprise all users in the current cell, all cell-edge users in the current cell, all cell-center users in the current cell, or specific users in the current cell.

7. The method according to claim 1, further comprising:

measuring interference levels of the adjacent cells relative to the current cell;

when the interference levels of the adjacent cells relative to the current cell are less than or equal to a first predetermined threshold, determining the interference levels as the low interference levels, when the interference levels of the adjacent cells relative to the current cell are greater than a second predetermined threshold, determining the interference levels as the high interference levels, and when the interference levels of the adjacent cells relative to the current cell are greater than the first predetermined threshold and less than or equal to the second predetermined threshold, determining the interference levels as the intermediate interference levels; and transmitting the interference level information to the adjacent cells.

8. The method according to claim 7, wherein the step of measuring the interference levels of the adjacent cells relative to the current cell comprises:

measuring interference values of the adjacent cells in each Physical Resource Block (PRB) relative to the current cell respectively, and taking the measured interference values of the adjacent cells relative to the current cell as the interference levels of the adjacent cells in each PRB relative to the current cell respectively; or measuring interference values of the adjacent cells in each PRB relative to the current cell respectively, and taking an average value of the measured interference values of the adjacent cells relative to the current cell as the interference levels of the adjacent cells in each PRB relative to the current cell.

9. The method according to claim 1, wherein numerals 0, 1 and 2 are used to represent the low interference level, the intermediate interference level and the high interference level respectively.

10. A Physical Uplink Shared Channel (PUSCH) power control apparatus, comprising:

a processor;

a hardware memory, which is connected with the processor via a bus interface and is configured to store program and data used for the processor;

a transceiver, which is configured to communicate with other devices through transmission media, when the processor calls and executes the program and data stored in the hardware memory, the apparatus executes the following processing:

receive interference level information from a plurality of adjacent cells, the interference level information including a plurality of symbols, each respective symbol in the plurality of symbols representing a low interference level, an intermediate interference level or a high interference level of a corresponding adjacent cell in the plurality of adjacent cells;

counting the plurality of symbols to determine the number of symbols representing the low interference level and the number of symbols representing the high interference level, or to determine the number of symbols representing the low interference level, the number of symbols representing the intermediate interference level, and the number of symbols representing the high interference level; and adjusting the PUSCH power for a current cell user in accordance with the number of symbols representing the low interference level and the number of symbols representing the high interference level, or in accordance with the number of symbols representing the low interference level, the number of symbols representing the intermediate interference level and the number of symbols representing the high interference level.

11. The apparatus according to claim 10, wherein the apparatus is configured to:

determine an interference value of the current cell user relative to the adjacent cells in accordance with the interference level information from the adjacent cells using the following equation:

$$\Delta_{IoT_{inter}} = \frac{n \cdot (estimateIoT1 - IoT_{target}) + p \cdot (estimateIoT2 - IoT_{target})}{n + p},$$

where n denotes the number of the low interference levels or the intermediate interference levels or the high interference levels in the interference levels of the adjacent cells, p denotes the number of the high interference levels or the low interference levels or the intermediate interference levels in the interference levels of the adjacent cells, estimateIoT1 denotes a predetermined estimated value corresponding to the low interference level or the intermediate interference levels or the high interference levels, estimateIoT2 denotes a predetermined estimated value corresponding to the high interference level or the low interference level or the intermediate interference levels, n and p are not of an identical meaning, n and estimateIoT1 are of an identical meaning, p and estimateIoT2 are of an identical meaning, and $IoT_{target}$ denotes a predetermined target interference value; and adjust the PUSCH power of the current cell user in accordance with the interference value of the current cell user relative to the adjacent cells, or the apparatus is configured to:

determine an interference value of the current cell user relative to the adjacent cells in accordance with the interference level information from the adjacent cells using the following equation:

$$\Delta_{IoT_{inter}} = \frac{n \cdot (estimateIoT1 - IoT_{target}) + p \cdot (estimateIoT2 - IoT_{target})}{m + n + p},$$

where m denotes the number of the intermediate interference levels or the low interference levels or the high interference levels in the interference levels of the adjacent cells, n denotes the number of the low interference levels or the high interference levels or the intermediate interference levels in the interference levels of the adjacent cells, p denotes the number of the high interference levels or the intermediate interference levels or the low interference levels in the interference levels of the adjacent cells, estimateIoT1 denotes a predetermined estimated value corresponding to the low interference level or the high interference levels or the intermediate interference levels, estimateIoT2 denotes a predetermined estimated value corresponding to the high interference level or the intermediate interference levels or the low interference levels, m and n and p are not of an identical meaning, n and estimateIoT1 are of an identical meaning, p and estimateIoT2 are of an identical meaning, and $IoT_{target}$ denotes a predetermined target interference value; and adjust the PUSCH power of the current cell user in accordance with the interference value of the current cell user relative to the adjacent cells.

12. The apparatus according to claim 11, wherein the apparatus is configured to:

update a power compensation factor α(j), a normalized expected reception Power Spectrum Density (PSD) $P_{O\_NOMINAL\_PUSCH}(j)$, an expected reception PSD offset $P_{O\_UE\_PUSCH}(j)$ of a UE, a gain $\Delta_{TF}(i)$ of a transmission format, or a target Signal to Interference plus Noise Ratio (SINR) in accordance with the interference value of the current cell user relative to the adjacent cells;

update a relevant parameter for calculating the target SINR in accordance with the updated α(j), $P_{O\_NOMINAL\_PUSCH}(j)$, $P_{O\_UE\_PUSCH}(j)$ or $\Delta_{TF}(i)$; and transmit the relevant parameter for calculating the target SINR via Radio Resource Control (RRC) signaling to users whose powers are to required to be adjusted, and update the target SINR in accordance with the updated relevant parameter for calculating the target SINR.

13. The apparatus according to claim 12, wherein the apparatus is configured to determine the user for which the power adjustment is to be performed in accordance with one of an A3 event, spectral efficiency and a difference in path loss between a current cell and an adjacent cell, or a combination thereof, and the users for which the power adjustment is to be performed comprise all users in the current cell, all cell-edge users in the current cell, all cell-center users in the current cell, or specific users in the current cell.

14. The apparatus according to claim 11, wherein the apparatus is configured to:

after the target SINR has been determined, modify the target SINR in accordance with the interference value of the current cell user relative to the adjacent cells; and transmit the modified target SINR via a closed-loop Transmitter Power Control (TPC) command field to the users for which the power adjustment is to be performed.

15. The apparatus according to claim 14, wherein the apparatus is configured to determine the user for which the power adjustment is to be performed in accordance with one of an A3 event, spectral efficiency and a difference in path loss between a current cell and an adjacent cell, or a combination thereof, and the users for which the power adjustment is to be performed comprise all users in the current cell, all cell-edge users in the current cell, all cell-center users in the current cell, or specific users in the current cell.

16. The apparatus according to claim 10, wherein the apparatus is further configured to:

measure interference levels of the adjacent cells relative to the current cell; when the interference levels of the adjacent cells relative to the current cell are less than or equal to a first predetermined threshold, determine the interference levels as the low interference levels, when the interference levels of the adjacent cells relative to the current cell are greater than a second predetermined threshold, determine the interference levels as the high interference levels, and when the interference levels of the adjacent cells relative to the current cell are greater than the first predetermined threshold and less than or equal to the second predetermined threshold, determine the interference levels as the intermediate interference levels; and transmit the interference level information to the adjacent cells.

17. The apparatus according to claim 16, wherein the apparatus is configured to:

measure interference values of the adjacent cells in each Physical Resource Block (PRB) relative to the current cell respectively, and take the measured interference values of the adjacent cells relative to the current cell as the interference levels of the adjacent cells in each PRB relative to the current cell respectively; or measure interference values of the adjacent cells in each PRB relative to the current cell respectively, and take an average value of the measured interference values of the adjacent cells relative to the current cell as the interference levels of the adjacent cells in each PRB relative to the current cell.

18. The apparatus according to claim 10, wherein numerals 0, 1 and 2 are used to represent the low interference level, the intermediate interference level and the high interference level respectively.

* * * * *